…

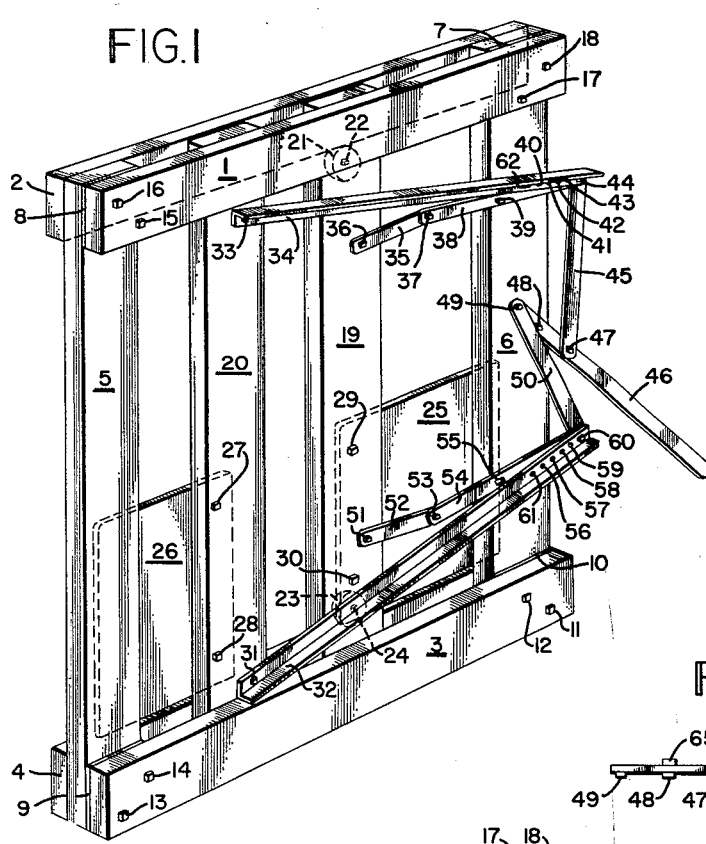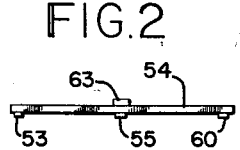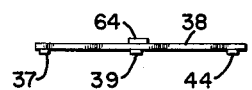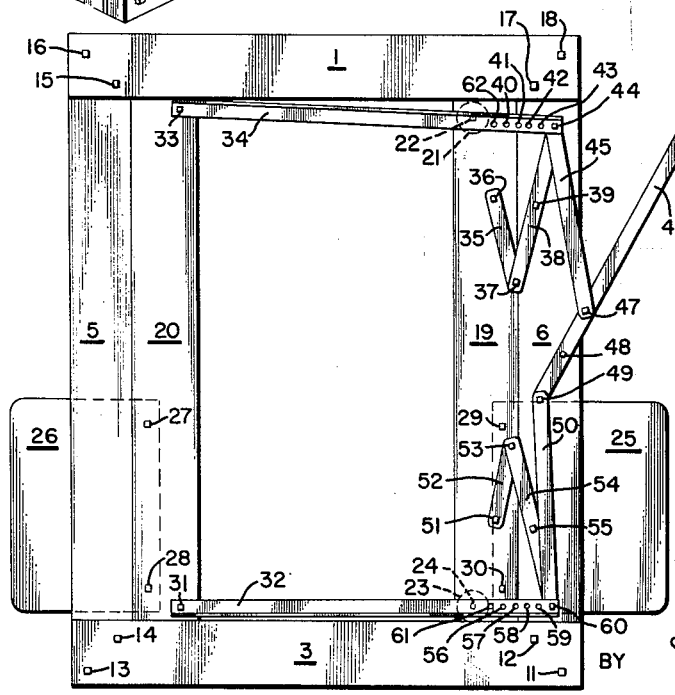
INVENTOR
MARVIN GRENZ
ATTORNEYS

United States Patent Office 3,155,073
Patented Nov. 3, 1964

3,155,073
CATTLE GATE
Marvin Grenz, Napoleon, N. Dak.
Filed Mar. 5, 1962, Ser. No. 177,663
6 Claims. (Cl. 119—98)

This invention generally relates to cattle gates and more particularly to a cattle gate whereby animals enter the cattle gate from its rear, and after the work being done on the animal is completed, the animal passes through the gate straight forward and thus quickly allows the operator to catch the next animal on its way out.

An object of the invention is to provide a cattle gate which is simple in construction, easy to use, well adapted for its intended purposes and relatively inexpensive to manufacture.

The primary object of this invention is to provide a speedy and safe means of handling livestock for the purpose of branding, vaccinating, dehorning, ear tagging, blood testing, or for any other purpose requiring that the animal be restrained.

Another object of the invention is to provide a neck restraining means controlled by a control lever that locks itself when the cattle gate is closed, thus enabling the operator to be free to work on the animal.

Still another object of the invention is to provide an adjustable means so that baby calves, pigs, sheep, horses, cows, or big bulls may always be held tight by the neck, thus eliminating neck and head locking devices which would be in the way most of the time the operator is working on the animal being held.

These objects, together with other objects and advantages which will become subsequently apparent, reside in the details of construction and operation as more fully hereinafter described and claimed, reference being had to the accompanying drawing forming a part hereof, wherein like numerals refer to like parts throughout, and in which:

FIG. 1 is a front perspective view of the invention and shows the cattle gate in a closed position.

FIG. 2 is an enlarged and detailed view of a lower link of the linking network.

FIG. 3 is an enlarged and detailed view of an upper link of the linking network.

FIG. 4 is an enlarged and detailed view of the control lever of the linking network.

FIG. 5 is a front view of the invention in its open position.

In carrying out the invention, referring now specifically to the drawing, there is provided a framework 70, including a pair of lower bars 3 and 4, a pair of upper bars 1 and 2, with a pair of vertical bars 5 and 6 inserted between the ends of lower bars 3 and 4, and upper bars 1 and 2, respectively. Vertical bars 5 and 6 are spaced from upper bar 1 and lower bar 3 with shims 7, 8, 9, and 10. Eight bolts 11, 12, 13, 14, 15, 16, 17, and 18 extend through the ends of the upper bars 1 and 2 and lower bars 3 and 4 for securing the vertical bars 5 and 6, and shims 7, 8, 9, and 10 thereto.

A pair of vertically extending and generally horizontally movable stanchion bars 19 and 20 are inserted between upper bars 1 and 2, and lower bars 3 and 4, of the framework in a position parallel to vertical bars 5 and 6 of the framework. A pair of rollers 21 and 23 are rotatably mounted on bolts 22 and 24 respectively, on the back side of stanchion bar 19 as shown in FIG. 1 by dotted lines. Rollers 23 and 21 run on lower bar 4 and upper bar 2 respectively, so as to keep stanchion bar 19 from moving vertically. Stanchion bar 20 is also kept from moving vertically by an adjustable lower link 32 and an adjustable upper link 34 both of which are mounted on the front of stanchion bar 20 by a pair of pivot bolts 33 and 31. Lower link 32 and upper link 34 are made of angle iron with one flat side sliding on lower bar 3 and upper bar 1. A pair of shields 25 and 26 are mounted on stanchion bars 19 and 20 by bolts 27, 28, 29, and 30 slightly above lower bar 4 so as not to slide on lower bar 4. Shields 25 and 26 are mounted on the back side of stanchion bars 19 and 20 as shown in FIG. 1 by the dotted lines.

A linking network consists of a control lever 46 pivotally mounted on vertical bar 6 of the framework by pivot bolt 48, said control lever 46 having a shim 65 on the back side about bolt 48 as shown in FIG. 4. An upper link 35 is connected to stanchion bar 19 by a pivot bolt 36. Another link 38, is pivotally mounted on vertical bar 6 by pivot bolt 39 and connected at one end by a pivot bolt 37 to upper link 35. Link 38 has a shim 64 on the back side about bolt 39 as shown in FIG. 3. The remaining end of link 38 is connected to an upper connecting link 45 by a pivot bolt 44, and the lower end of the connecting link 45 is connected to the control lever 46 by a pivot bolt 47. The upper adjustable link 34 which is connected at one end to stanchion bar 20 by pivot bolt 33, has its other end formed with a plurality of holes, and is connected to the upper end of connecting link 45 by a pivot bolt 44.

A lower link 52 is connected to stanchion bar 19 by a pivot bolt 51. Another link 54, is pivotally mounted on vertical bar 6 by a pivot bolt 55 and connected at one end to lower link 52 by a pivot bolt 53. Link 54 has a shim 63 on the back side about bolt 55 as shown in FIG. 2. The remaining end of link 54 is connected to a lower connecting link 50 by a pivot bolt 60, and the upper end of the connecting link 50 is connected to the control lever 46 by a pivot bolt 49. The lower adjustable link 32 which is connected at one end to stanchion bar 20 by a pivot bolt 31, has its other end formed with a plurality of holes, and is connected to the lower end of connecting link 50 by a pivot bolt 60.

In accordance with the embodiment presented herewith, comparisons of the relative dimensions of the linkages will now be set forth. As evidenced in the drawings, upper link 35 and lower link 52 are of the same length. Links 38 and 54 are also equal in length to each other and are approximately twice the length of upper and lower links 35 and 52. It will also be seen that upper connecting link 45 is shorter than lower connecting link 50 and that the dimension between pivot bolts 48 and 49 is shorter than the dimension between pivot bolts 48 and 47 as measured along control lever 46. Also, the combined dimensions between pivot bolts 48 and 49 and pivot bolts 49 to 60 is approximately ½ longer than the combined dimensions between pivot bolts 48 to 47 and pivot bolts 47 to 44.

In the operation of this invention, control lever 46 controls all the movable parts of the cattle gate. When control lever 46 is moved to the upward position as shown in FIG. 5, the linking network is moved into position so as to move stanchion bars 19 and 20 apart until they are adjacent to vertical bars 5 and 6 of the framework thus providing a big rectangular opening for the animals to pass through forwardly from the back side of the cattle gate. This provides a fast way of handling animals when this cattle gate is mounted in front of a narrow runway, or squeeze chute, or in front of a small barn door since the animals do not have to be released out the side of the gate or driven out the back of a runway. Shields 25 and 26 are mounted on the back side of the stanchion bars 19 and 20 so as to keep the animals from getting their legs out through the front where they can hurt themselves and the person working on the animal. Shields 25 and 26 are mounted on stanchion bars 19 and 20 so as to move apart with the stanchion bars 19 and 20 and not restrict the big opening for the animal to pass through the front of the cattle gate.

When control lever 46 is in the downward or closed position, uppers links 35 and 38, and lower links 52 and 54 are in an off center position forming a self-locking arrangement at pivot bolt 48 by lower connecting link 50 moving against pivot bolt 48 as shown in FIG. 1. In this closed position, stanchion bars 19 and 20 are moved towards each other so as to hold the animal tight at the neck. The linking network is so designed and mounted that stanchion bar 19 travels a greater distance apart and together than stanchion bar 20 to allow a big opening between stanchion bar 19 and vertical bar 6 of the framework for the purpose of vaccinating.

During the period when control lever 46 is being moved from its upper most position (where the gate is open) to the lower most position (where the gate is closed), connecting link 50 is caused to move pivot bolt 60 at a slightly faster vertical rate than pivot bolt 44 due to the shorter dimension between pivot bolts 48 and 49 than the longer dimension between pivot bolts 48 and 47 as explained earlier. Thus, link 54 is initially rotated at a higher rate which results in stanchion bar 19 moving laterally at the bottom at a higher rate than the top, thereby forcing the animal's neck to be engaged from underneath first. As control lever 46 rotates further, the lateral rate of movement of the bottom of stanchion bar 19 decreases and the top increases resulting in the stanchion bars assuming a parallel position with each other upon ceasing movement.

Upper link 34 has a plurality of holes 62, 41, 42, and 43 besides the one admitting bolt 44, to which links 38 and 45 may be pivotally connected so that the framework may accommodate animals of different size. In like manner and cooperating with upper link 34, is lower link 32 which has a plurality of holes 61, 56, 57, 58, and 59 besides the one admitting bolt 60, to which links 50 and 54 may be pivotally connected so that the framework may accommodate animals of different size.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. An animal gate comprising in combination:
   (a) an upright open framework having a pair of vertical side bars disposed in spaced relation and fixedly joined with an upper pair of horizontal bars and a lower pair of horizontal bars disposed from said upper pair;
   (b) a pair of stanchion bars engaging said upper and lower pair of horizontal bars in horizontal sliding relation therewith;
   (c) a control lever rotatably mounted on one of said vertical side bars and having first and second pivot points oppositely disposed from the point of rotatable mounting;
   (d) a pair of upper and lower linking networks each including a pivot support on said one of said vertical side bars remote from said point of rotatable mounting of said control lever, said upper and lower linking networks being pivotally connected between said first and second pivot points on said control lever and the nearest one of said pair of stanchion bars for producing horizontal movement thereof;
   (e) and an adjustable link disposed adjacent each of said pairs of upper and lower linking networks respectively and pivotally connected to the other one of said pair of stanchion bars at one end of said links and to said corresponding upper and lower linking networks, said stanchion bars moving alternately towards and away from each other as said control lever is rotated between a first and second predetermined position.

2. An animal gate as set forth in claim 1 wherein said upper and lower linking networks each include a first link pivotally connected at its midpoint to said vertical side bar to which said control lever is mounted to provide said pivot supports for said upper and lower linking networks; a second link pivotally connected between one of said first links and said stanchion bar nearest said control lever; and a connecting link connected to the other end of said first link, said connecting link of said upper linking network being connected at its other end to said first pivot point of said control lever, and said connecting link of said lower linking network being connected at its other end to said second pivot point of said control lever.

3. An animal gate as set forth in claim 2 wherein said connecting link of said upper linking network is of shorter dimension than said corresponding connecting link in said lower linking network and wherein said first pivot point on said control lever is disposed a greater dimension from said point of rotatable mounting than said second pivot causing the lower portion of said stanchion bar nearest said control lever to move at a greater rate than the top portion when said stanchion bars are initially caused to move towards each other.

4. An animal gate as set forth in claim 2 wherein said pivotal connections of said first and second link in each of said upper and lower linking networks are substantially aligned perpendicular to said stanchion bars causing said bars to be effectively locked against horizontal movement upon said control lever being rotated from said first to said second predetermined position.

5. An animal gate as set forth in claim 2 including a pair of shields connected to each of said stanchion bars and extending outwardly towards, and adjacent to, said vertical side bars; and a plurality of rollers attached to said stanchion bars for cooperatively engaging at least one of each pair of said upper and lower pair of horizontal bars to aid the horizontal movement of said stanchion bars.

6. An animal gate as set forth in claim 2 wherein said second link has a length approximately one-half that of said first link whereby said stanchion bar connected to said second link travels approximately twice the horizontal distance of said stanchion bar connected to said pair of adjustable links providing a space between said first mentioned stanchion bar and said adjacent vertical side bar which is twice that of a space between said second mentioned stanchion bar and said adjacent vertical side bar upon said control lever rotating from said first to said second predetermined position.

References Cited in the file of this patent

UNITED STATES PATENTS

| | | |
|---|---|---|
| 1,388,258 | Hasty | Aug. 23, 1921 |
| 1,487,977 | Ryan | Mar. 25, 1924 |
| 2,999,480 | Sparkman | Sept. 12, 1961 |
| 3,010,429 | Grissom | Nov. 28, 1961 |